United States Patent
Yamamoto (10) Patent No.: US 8,322,131 B2
(45) Date of Patent: Dec. 4, 2012

(54) INTERNAL COMBUSTION ENGINE EXHAUST GAS CLEANING APPARATUS AND EXHAUST GAS CLEANING METHOD

(75) Inventor: Risa Yamamoto, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 409 days.

(21) Appl. No.: 12/811,629

(22) PCT Filed: Feb. 17, 2009

(86) PCT No.: PCT/IB2009/000280
§ 371 (c)(1),
(2), (4) Date: Jul. 2, 2010

(87) PCT Pub. No.: WO2009/106946
PCT Pub. Date: Sep. 3, 2009

(65) Prior Publication Data
US 2010/0287913 A1  Nov. 18, 2010

(30) Foreign Application Priority Data
Feb. 26, 2008 (JP) .................... 2008-044865

(51) Int. Cl.
*F01N 3/18* (2006.01)
(52) U.S. Cl. ........... 60/286; 60/274; 60/285; 60/295; 60/300; 60/301
(58) Field of Classification Search ............ 60/274, 60/276, 277, 285, 286, 287, 295, 300, 301, 60/303
See application file for complete search history.

(56) References Cited

U.S. PATENT DOCUMENTS

2006/0064969 A1* 3/2006 Yoshida et al. ............. 60/286
2009/0031709 A1* 2/2009 Yoshida et al. ............. 60/286
(Continued)

FOREIGN PATENT DOCUMENTS
JP      2004-360595 A    12/2004
(Continued)

OTHER PUBLICATIONS

An English translation of the Japanese Office Action of corresponding Japanese Application No. JP 2008-044865, dated Jan. 20, 2012, mailed Jan. 24, 2012.
Extended International Search Report of the corresponding International Application No. PCT/IB2009/000280.

*Primary Examiner* — Thomas Denion
*Assistant Examiner* — Jorge Leon, Jr.
(74) *Attorney, Agent, or Firm* — Global IP Counselors, LLP (57) ABSTRACT

An internal combustion engine exhaust gas cleaning apparatus is basically provided with a NOx trapping catalytic converter, a sulfur poisoning amount estimating section and a sulfur poisoning removal section. The NOx trapping catalytic converter is arranged in an exhaust passage to trap NOx contained in an exhaust gas flowing through the exhaust passage when an air-fuel ratio of the exhaust gas is lean and to release trapped NOx when an air-fuel ratio of the exhaust gas is rich. The sulfur poisoning amount estimating section estimates an estimated sulfur poisoning amount of sulfur poisoning of the NOx trapping catalytic converter based on a fuel consumption amount and an oil consumption amount. The sulfur poisoning removal section raises a temperature of the NOx trapping catalytic converter to a sulfur poisoning removal temperature based on the estimated sulfur poisoning amount to remove sulfur poisoning from the NOx trapping catalytic converter.

12 Claims, 8 Drawing Sheets

U.S. PATENT DOCUMENTS

| | | | |
|---|---|---|---|
| 2009/0044518 A1* | 2/2009 | Frouvelle et al. | 60/286 |
| 2009/0071125 A1* | 3/2009 | Yoshida | 60/286 |
| 2009/0171553 A1* | 7/2009 | Audouin et al. | 701/108 |
| 2009/0173059 A1* | 7/2009 | Frouvelle et al. | 60/277 |

FOREIGN PATENT DOCUMENTS

| | | |
|---|---|---|
| JP | 2007-255321 A | 10/2007 |
| JP | 2009-19552 A | 1/2009 |
| JP | 2009-19553 A | 1/2009 |

* cited by examiner

FIG. 1

NOx IS TRAPPED AS A NITRATE

FIG. 2A

TRAPPED NOx REDUCED TO NITROGEN

FIG. 2B

SULFUR TRAPPED AS A SULFATE, STABILIZATION OCCURS

INTERNAL COMBUSTION ENGINE EXHAUST GAS CLEANING APPARATUS AND EXHAUST GAS CLEANING METHOD

CROSS-REFERENCE TO RELATED APPLICATIONS

This U.S. National stage application claims priority to Japanese Patent Application No. 2008-044865, filed on Feb. 26, 2008. The entire disclosure of Japanese Patent Application No. 2008-044865 is hereby incorporated herein by reference.

BACKGROUND

1. Field of the Invention

The present invention generally relates to an internal combustion engine exhaust gas cleaning apparatus and an exhaust gas cleaning method for an internal combustion engine. More specifically, the present invention relates to an exhaust gas cleaning apparatus and method in which a NOx trapping catalytic converter is provided in an exhaust passage.

2. Background Information

Japanese Laid-Open Patent Publication No. 2000-274229 discloses an example of a conventional exhaust gas cleaning apparatus for an internal combustion engine. In the apparatus disclosed in this publication, a navigation system identifies a fueling station where the vehicle was fueled and estimates a sulfur concentration (sulfur content) based on information regarding the identified fueling station. Then, based on the estimated sulfur concentration in the fuel and a fuel injection amount, the apparatus estimates a sulfur poisoning amount of the NOx trap catalytic converter. Based on the estimated sulfur poisoning amount, the apparatus determines if the performance of the catalytic converter has declined and, if necessary, controls a temperature of the catalytic converter and an air-fuel ratio so as to remove the sulfur poisoning from the catalytic converter.

SUMMARY

It has been discovered that in actual operating conditions occurring in a vehicle, sulfur from engine oil is adsorbed in the NOx trapping catalytic converter in addition to sulfur from fuel. The conventional exhaust gas cleaning apparatus disclosed in Japanese Laid-Open Patent Publication No. 2000-274229 does not take into account the sulfur that is adsorbed from engine oil. Consequently, with the conventional exhaust gas cleaning apparatus disclosed in this publication, the estimated amount of sulfur poisoning is smaller than the actual amount. As a result, sufficient removal of sulfur poisoning cannot be accomplished, and thereby resulting in a decline of the exhaust gas cleaning performance (NOx cleaning rate) of the catalytic converter.

The present invention was conceived in view of this problem. One object of the present invention is to optimally remove sulfur poisoning from a NOx catalytic converter provided in an exhaust passage.

In accordance with one aspect of the present invention, an internal combustion engine exhaust gas cleaning apparatus comprises a NOx trapping catalytic converter, a sulfur poisoning amount estimating section and a sulfur poisoning removal section. The NOx trapping catalytic converter is arranged in an exhaust passage to trap NOx contained in an exhaust gas flowing through the exhaust passage when an air-fuel ratio of the exhaust gas is lean and to release trapped NOx when an air-fuel ratio of an exhaust gas is rich. The sulfur poisoning amount estimating section estimates an estimated sulfur poisoning amount of sulfur poisoning of the NOx trapping catalytic converter based on a fuel consumption amount and an oil consumption amount. The sulfur poisoning removal section raises a temperature of the NOx trapping catalytic converter to a sulfur poisoning removal temperature based on the estimated sulfur poisoning amount to remove sulfur poisoning from the NOx trapping catalytic converter.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
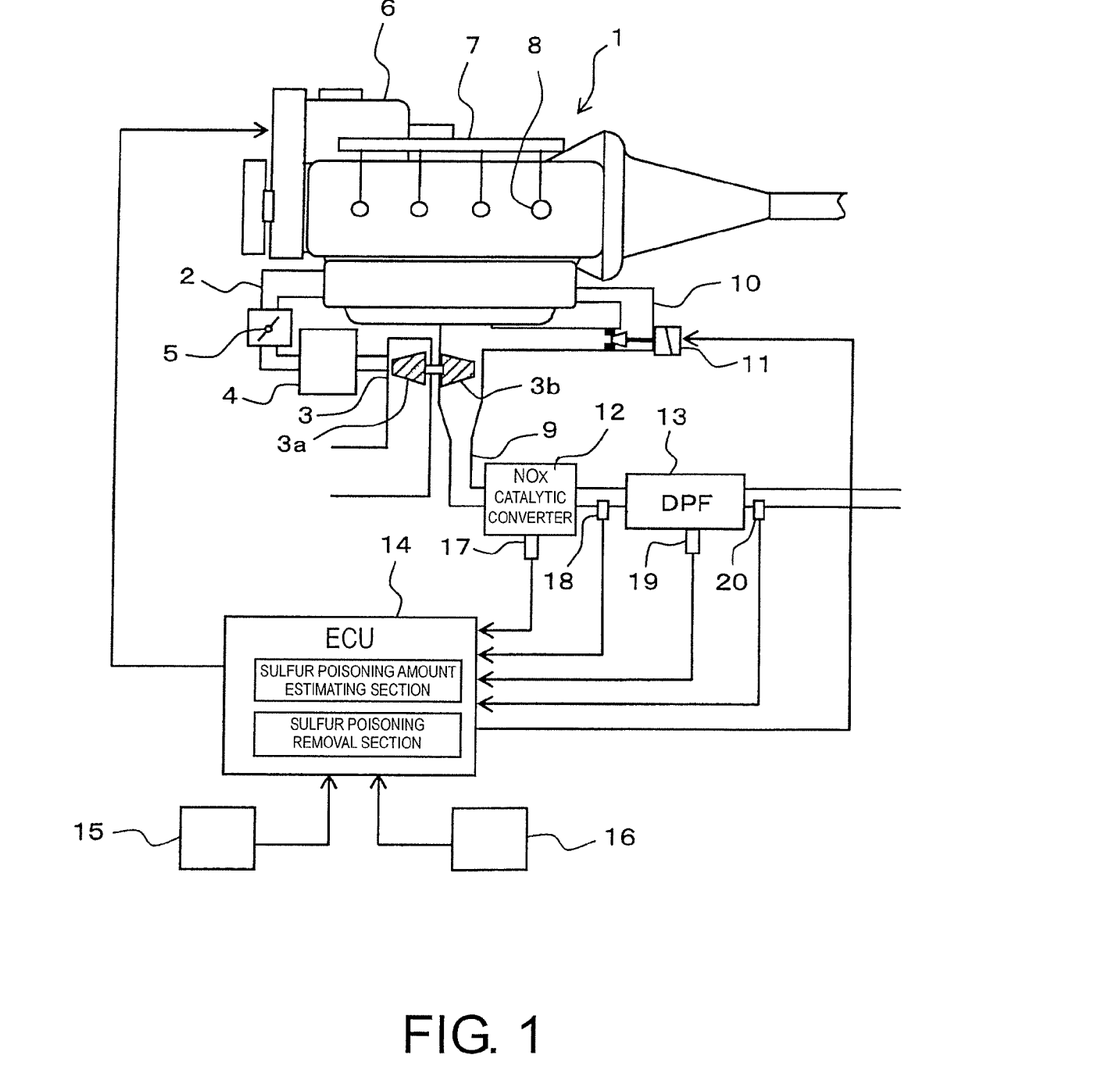
FIG. 1 is a schematic view of an internal combustion engine, e.g., a diesel engine with an internal combustion engine exhaust gas cleaning apparatus in accordance with one illustrated embodiment.

Referring initially to FIG. 1, an internal combustion engine 1, e.g., a supercharged diesel engine is schematically illustrated with an internal combustion engine exhaust gas cleaning apparatus in accordance with one illustrated embodiment.

The engine 1 can be applied to internal combustion engines used in vehicles such as automobiles and the like. Basically, as seen in FIG. 1, the engine 1 includes an air intake passage 2 having a turbocharger (supercharger) 3 with a compressor 3a disposed upstream in the air intake passage 2 of the air intake system. The compressor 3a serves to pressurize or supercharge the intake air. The compressor 3a is rotated by a turbine 3b that is driven by exhaust gas flowing through an exhaust system of the engine 1. The air intake passage 2 also includes an intercooler 4 for cooling the intake air after supercharging the intake air by the compressor 3a of the turbocharger (supercharger) 3. An air intake throttle 5 is disposed in the air intake passage 2 of the air intake system to regulate the flow of intake air to the combustion chambers of each cylinder of the engine 1. After passing through the throttle valve 5, the intake air passes through a collector and into the combustion chambers of the cylinders.

An oil pan (not numbered) is arranged on a bottom portion of the engine 1 for collecting lubricating engine oil (hereinafter called "oil"). Oil collected in the oil pan is splashed onto sliding portions of the cylinders and pistons by the crankshaft and supplied to various portions of the engine by an oil pump. The engine oil typically contains sulfur S and calcium Ca.

The engine 1 further includes a common rail fuel injection system that includes a fuel injection pump 6, a common rail 7 and a plurality of fuel injection valves 8, so that the high pressure fuel is supplied by the fuel injection pump 6 and directly injected into the combustion chambers of the cylinders from fuel injection valves 8. In other words, the fuel injection pump 6 pumps fuel to the common rail 7, where the pressurized fuel accumulates, and high-pressure fuel is injected directly into the combustion chambers of each cylinder when the fuel injection valves 8 are opened. Thus, the fuel injection pump 6, the common rail 7 and the fuel injection valves 8 constitute a common rail fuel injection device or system.

A fuel-air mixture is formed by the intake air that flows into the combustion chambers and the high-pressure fuel that is injected into the combustion chambers. The fuel-air mixture is combusted by compression ignition in the combustion chambers of each cylinder. The exhaust gas resulting from the combustion flows out into a main exhaust passage 9. The exhaust system includes an exhaust gas recirculation (EGR) passage 10 that branches from the main exhaust passage 9 from a position between the engine 1 and the turbine 3b. The portion of the exhaust gas flowing into the EGR passage 10 is recirculated to the intake side of the engine 1 as EGR gas through an EGR passage 10 and an EGR valve 11. The remaining exhaust gas passes through an exhaust gas turbine 3b of the turbocharger 3, thereby driving the turbocharger 3. The turbocharger 3 is a variable nozzle type turbocharger.

The exhaust system is also provided with a NOx trapping catalytic converter 12 and a diesel particulate filter (DPF) 13 that are arranged in the main exhaust passage 9 downstream of the turbine 3b for cleaning exhaust gas. The NOx trapping catalytic converter 12 traps NOx contained in the exhaust gas when the air-fuel ratio of the exhaust gas is lean and releases trapped NOx when the air-fuel ratio of the exhaust gas is stoichiometric or rich. The NOx trapping catalytic converter 12 will be described in more detail later.

The DPF 13 is configured to capture small particles (particulate matter) contained in the exhaust gas. An engine control unit (ECU) 14 is provided for controlling the engine 1 including controlling the exhaust gas cleaning operations of the NOx trapping catalytic converter 12 and the DPF 13. The ECU 14 receives a signal from a crank angle sensor 15 serving to detect an engine rotational speed Ne and a signal from an accelerator position sensor 16 serving to detect an accelerator position APO and uses these input signals to control the engine 1. The ECU 14 also receives a signal from a vehicle speed sensor serving to detect a speed of a vehicle in which the engine 1 is installed.

The ECU 14 is a microcomputer comprising a central processing unit (CPU) and other peripheral devices. The ECU 14 can also include other conventional components such as an input interface circuit, an output interface circuit, and storage devices such as a ROM (Read Only Memory) device and a RAM (Random Access Memory) device. The ECU 14 preferably includes an engine control program that controls various components. The ECU 14 receives input signals from various sensors that serve to detect the operating state of the engine 1 and executes the aforementioned controls based on these signals. It will be apparent to those skilled in the art from this disclosure that the precise structure and algorithms for the ECU 14 can be any combination of hardware and software that will carry out the functions described herein.

The ECU 14 also receives input signals from a catalyst temperature sensor 17, an exhaust gas pressure sensor 18, a DPF temperature sensor 19 and an air-fuel ratio sensor 20. The catalyst temperature sensor 17 is arranged to detect a temperature of the NOx catalytic converter 12 (i.e., a catalyst temperature). The exhaust gas pressure sensor 18 is arranged to detect an exhaust gas pressure in the main exhaust passage 9 at an inlet side of the DPF 13. The DPF temperature sensor 19 is arranged to detect a temperature (DPF temperature) of the DPF 13. The air-fuel ratio sensor 20 is arranged to detect an air-fuel ratio of exhaust gas in the main exhaust passage 9 at an outlet side of the DPF 13. It is also acceptable to provide an exhaust gas temperature sensor downstream of the NOx trapping catalytic converter 12 and the DPF 13 so as to detect the temperatures of the NOx trapping catalytic converter 12 and the DPF 13 indirectly based on the exhaust gas temperature.

Based on the input signals, the ECU 14 determines and sets the intake air quantity Qa, the fuel injection quantity Qf and the injection timing IT based on detection signals from various sensors that serve to detect the operating state of the engine 1 and executes the controls based on these signals in a conventional manner. Thus, the ECU 14 sends a fuel injection command signal to the fuel injection valves 8 to control the fuel injection amount and injection timing of the fuel injected by the fuel injection valves 8, an opening degree command signal to the intake throttle valve 5, and an opening degree command signal to the EGR valve 11 in response to detection signals from various sensors.

The ECU 14 has a sulfur poisoning amount estimating section configured to estimate a sulfur poisoning amount of the NOx trapping catalytic converter 12 and a sulfur poisoning removal section configured to remove sulfur poisoning by raising a temperature of the NOx trapping catalytic converter 12 to a temperature at which sulfur poisoning can be removed when the estimated sulfur poisoning amount indicates that the sulfur poisoning should be removed.

Basically, the ECU 14 is configured to estimate an amount of sulfur poisoning of the NOx trapping catalytic converter 12 based on a fuel consumption amount and an engine oil consumption amount. Sulfur poisoning of the NOx trapping catalytic converter 12 is removed based on the estimated amount of sulfur poisoning. By estimating the sulfur poisoning amount of the NOx trapping catalytic converter based on a fuel consumption amount and an engine oil consumption amount, the engine control unit (ECU) 14 can estimate the sulfur poisoning amount of the catalytic converter accurately and remove the sulfur poisoning in an optimal manner.

The NOx trapping catalytic converter 12 will now be explained based on FIGS. 2A to 4.

Figure 2A:
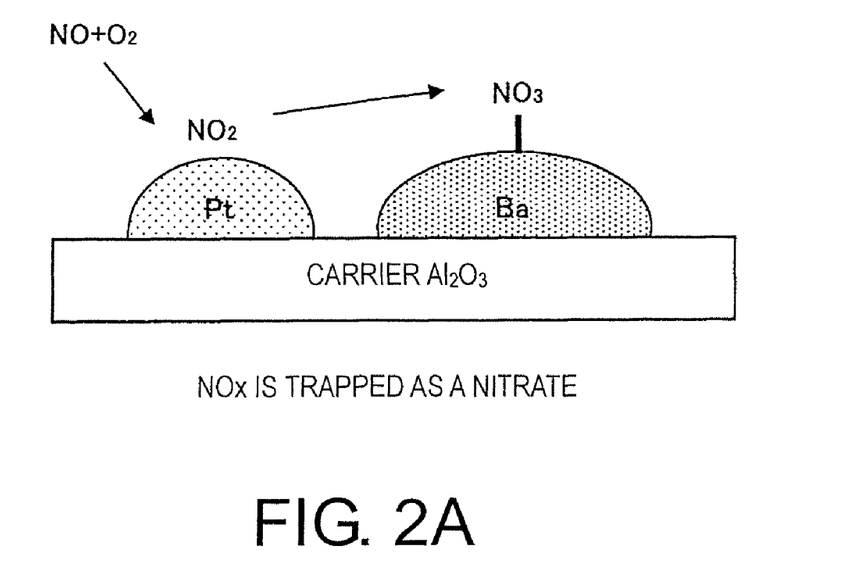
FIG. 2A is a diagram illustrating how a NOx trapping catalytic converter traps NOx.
Figure 2B:
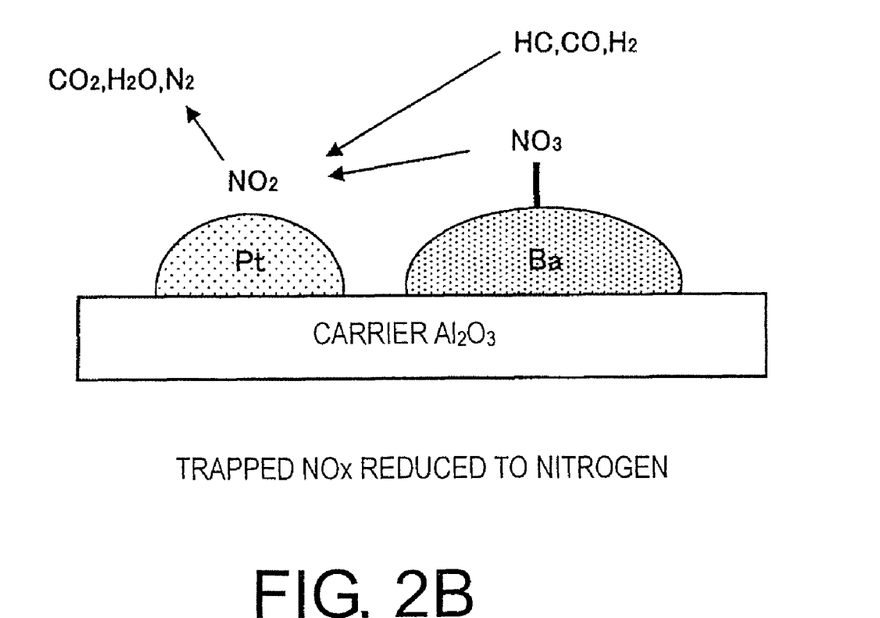
FIG. 2B is a diagram illustrating how a NOx trapping catalytic converter releases NOx.

FIGS. 2A and 2B illustrate how the NOx trapping catalytic converter 12 traps and releases NOx. In particular, FIG. 2A illustrates the NOx trapping catalytic converter 12 when the NOx trapping catalytic converter 12 traps NOx, while FIG. 2B illustrates the NOx trapping catalytic converter 12 when the NOx trapping catalytic converter 12 releases NOx. As shown in FIGS. 2A and 2B, the NOx trapping catalytic converter 12 comprises an alumina ($Al_2O_3$) honeycomb carrier coated with the noble metal platinum (Pt) and the alkaline earth metal barium (Ba), which serves as a NOx trapping agent. Although platinum is used in this embodiment, it is also possible to use another noble metal, such as palladium (Pd) or rhodium (Rh). Although barium is used as a NOx trapping agent in this embodiment, it is also possible to use another alkaline earth metal or another alkali metal, such as cesium (Cs). When the air-fuel ratio of the exhaust gas is lean, the NOx (e.g., NO) contained in the exhaust gas is oxidized by the platinum (Pt) and trapped as a nitrate (barium nitrate) in the NOx trapping agent (barium (Ba)), as shown in FIG. 2A. Meanwhile, when the air-fuel ratio of the exhaust gas is rich, the trapped NOx is reduced (deoxidized) by reduction components (e.g., HC and CO) and released in a clean form, as shown in FIG. 2B.

Figure 3A:
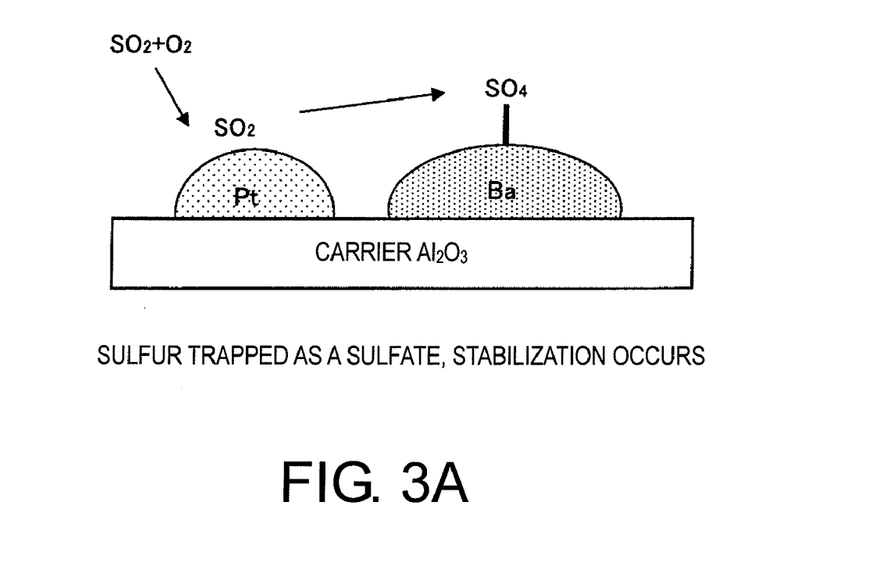
FIG. 3A is a simplified diagram illustrating sulfur poisoning of a NOx trapping catalytic converter.
Figure 3B:
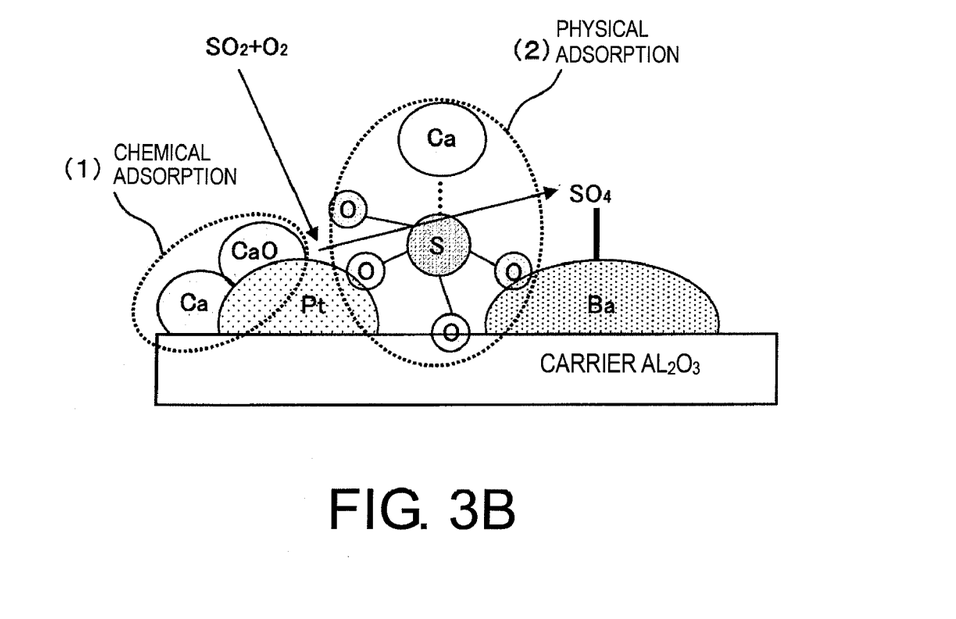
FIG. 3B is a simplified diagram illustrating sulfur poisoning of a NOx trapping catalytic converter with a portion of calcium (Ca) contained in the exhaust gas being adsorbed by the surface of the NOx trapping catalytic converter by chemical adsorption and physical adsorption.

FIGS. 3A and 3B illustrate sulfur poisoning of the NOx trapping catalytic converter 12. As shown in FIG. 3A, the NOx trapping catalytic converter 12 oxidizes sulfur contained in the exhaust gas and traps the sulfur as a sulfate (barium sulfate) in the NOx trapping agent (barium (Ba)) in basically the same manner as it traps NOx. The trapped sulfur causes the NOx trapping catalytic converter 12 to lose its capacity for holding NOx (i.e. stabilize). Sulfur poisoning refers to this state in which the catalytic converter 12 has stabilized due to the trapping of sulfur. The sulfur in the exhaust gas includes sulfur from the consumed fuel and sulfur from consumed engine oil. Therefore, in order to determine the amount of sulfur poisoning, it is necessary to take both sulfur from the fuel and sulfur from the engine oil into account.

As the amount of oil consumption becomes larger (i.e., the larger the ratio of the sulfur poisoning that is made up of sulfur coming from oil), the catalytic activity level of the NOx trapping catalytic converter 12 will increasingly decline. Thus, the poisoning removal rate will be lower when a sulfur poisoning removal operation is executed. The reason for this phenomenon will now be explained.

Oil generally contains sulfur (S), calcium (Ca), and other substances. As the amount of oil consumed becomes larger (i.e., as the ratio of the sulfur poisoning that is made up of sulfur from oil becomes larger), the amount of calcium and other substances contained in the exhaust gas will also become larger. A portion of calcium (Ca) contained in the exhaust gas adsorbs to the surface of the NOx trapping catalytic converter 12 by (1) chemical adsorption and (2) physical adsorption, as shown in FIG. 3B. Here, chemical adsorption refers to calcium (Ca) adsorbing to the surface of the platinum (Pt) in the form of calcium (Ca) or calcium oxide (CaO). Physical adsorption refers to calcium (Ca) that bonds with sulfur from the exhaust gas in the form of calcium sulfate ($CaSO_4$) after the sulfur has oxidized, thereby adsorbing to the NOx trapping catalytic converter 12. The chemical adsorption is stronger than the physical adsorption. These types of adsorption are not limited to calcium (Ca) and occur similarly with other substances (inhibitors) contained in the oil.

The chemical adsorption and the physical adsorption cause the activity of the NOx trapping catalytic converter 12 to decline. More specifically, if compounds of calcium (Ca) are present, then the contact surface area between the platinum (Pt) and the NOx trapping agent (barium (Ba)) will be smaller and, thus, the amount of sulfur (S) that can be released will decrease. Calcium (Ca) is only one example and the same effect occurs when the distance between the platinum (Pt) and the NOx trapping agent (barium (Ba)) is widened by another inhibitor compound. This effect is illustrated in FIG. 4.

Figure 4:
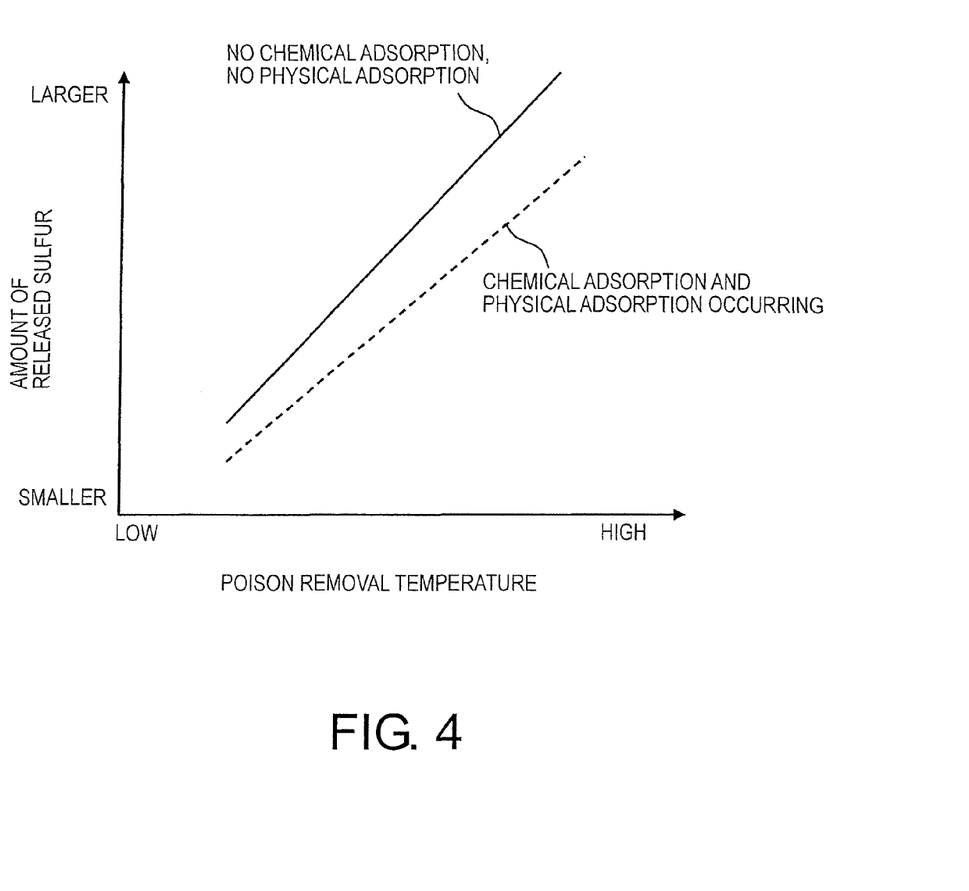
FIG. 4 is a graph illustrating relationships between a sulfur release amount and a poisoning removal temperature when sulfur poisoning is being removed.

FIG. 4 illustrates relationships between the sulfur release amount and a poisoning removal temperature of the NOx trapping catalytic converter 12 when sulfur poisoning is being removed. In FIG. 4, the solid-line curve indicates the relationship that exists when there is no chemical or physical adsorption of calcium onto the NOx catalytic converter 12, and the dotted-line curve indicates the relationship that exists when there is chemical and physical adsorption of calcium onto the NOx catalytic converter 12.

As indicated in FIG. 4, the amount of sulfur released increases as the poisoning removal temperature increases both when there is no chemical or physical adsorption and when there is chemical and physical adsorption. However, for a given poisoning removal temperature, the amount of sulfur released is smaller when chemical and physical adsorption has occurred than when there is no chemical or physical adsorption. In other words, the rate at which poisoning is removed during sulfur poisoning removal is lower when chemical and physical adsorption has occurred. As described above, when calcium and/or other substances have undergone chemical and physical adsorption, the catalytic activity of the NOx trapping catalytic converter 12 declines and it becomes more difficult to release sulfur that has adsorbed onto the catalytic converter 12.

Consequently, as the amount of oil consumption becomes larger (i.e., as the ratio of the sulfur poisoning that is made up of sulfur from oil becomes larger), the amount of calcium and other substances contained in the exhaust gas becomes larger and the amount of calcium and other substances adsorbed to the catalytic converter 12 becomes larger. As a result, the catalytic activity level of the NOx trapping catalytic converter 12 declines and the poisoning removal rate attained during sulfur poisoning removal declines.

Figure 5:
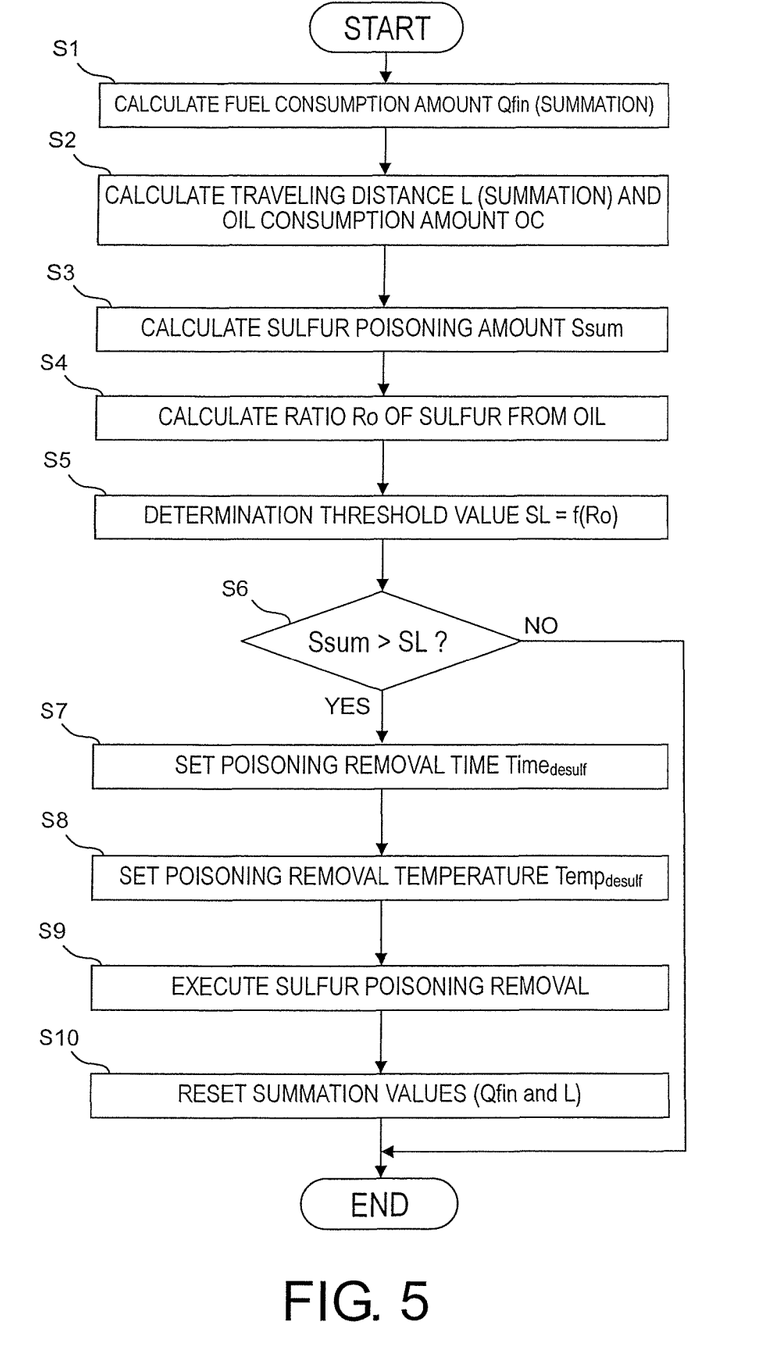
FIG. 5 is a flowchart showing a sulfur poisoning removal control executed by the internal combustion engine exhaust gas cleaning apparatus.

A sulfur poisoning removal control for the NOx trapping catalytic converter 12 that takes into account the oil consumption rate will now be explained using FIGS. 5 to 8. FIG. 5 is a flowchart showing a sulfur poisoning removal control for the NOx trapping catalytic converter 12 that is executed by the ECU 14.

The sulfur poisoning amount estimating section of the ECU 14 executes steps S1 to S3 to estimate the sulfur poisoning amount, and the sulfur poisoning removal section of the ECU 14 executes steps S4 to S10 to execute a removal of the sulfur poisoning.

In step S1, the ECU 14 calculates a fuel consumption amount Qfin by calculating a cumulative fuel injection amount (summation) based on an injection pulse width of the fuel injection valves 8. Data indicating the calculated (cumulative) fuel consumption amount Qfin is stored in a backup RAM provided in the ECU 14 and kept when the engine is stopped. The fuel consumption amount Qfin data stored in the backup RAM is reset in step S10 after the sulfur poisoning removal is executed in step S9.

In step S2, the ECU 14 calculates an oil consumption amount OC by calculating a cumulative vehicle traveling distance L (summation) based on an output of a vehicle speed sensor and, for example, multiplying the traveling distance L by a prescribed conversion coefficient. Data indicating the calculated (cumulative) traveling distance L is stored in the backup RAM provided in the ECU 14 and kept when the engine is stopped. The cumulative traveling distance L data stored in the backup RAM is reset in step S10 after the sulfur poisoning removal is executed in step S9. Although in this embodiment the oil consumption amount OC is calculated based on a cumulative (summation) value of the traveling distance L of the vehicle, it is also acceptable to provide an oil level sensor in an oil tank where the engine oil is stored and calculate the oil consumption amount OC (as a summation) based on oil levels detected by the oil level sensor.

In step S3, the ECU 14 calculates a total estimated sulfur poisoning amount Ssum of the NOx trapping catalytic converter 12 using the equation shown below.

$$Ssum = (Kq \times Qfin \times Sconc.q) + (Ko \times OC \times Sconc.o) \quad (1)$$

Ssum: total estimated sulfur poisoning amount
Qfin: fuel consumption amount
OC: oil consumption amount
Sconc.q: sulfur concentration in fuel
Sconc.o: sulfur concentration in oil
Kq: adsorption rate of sulfur from fuel
Ko: adsorption rate of sulfur from oil Although in the equation (1) above the sulfur concentration Sconc.q of the fuel is a prescribed value set in advance, it is also acceptable to use a navigation system to identify a fueling station where the vehicle was fueled and set the sulfur concentration Sconc.q of the fuel based on information regarding the identified fueling station. Similarly, while the sulfur concentration Sconc.o of the oil is a prescribed value set in advance, it is also acceptable to set the sulfur concentration Sconc.o of the oil each time the oil is changed. The adsorption rate Kq of sulfur from fuel indicates the ratio of the sulfur contained in the consumed fuel that adsorbs onto the NOx trapping catalytic converter 12. In this embodiment, the adsorption rate Kq of sulfur from fuel is a fixed value.

The portion (Kq×Qfin×Sconc.q) of the equation (1) expresses the amount of sulfur from the consumed fuel that has adsorbed onto the NOx trapping catalytic converter 12 and is called the "estimated amount of sulfur from fuel." Thus, the estimated amount of sulfur from fuel is calculated based on the adsorption rate Kq of sulfur from fuel, the fuel consumption amount Qfin, and the sulfur concentration Sconc.q of the fuel. The portion (Ko ×OC×Sconc.o) of the equation (1) expresses the amount of sulfur from the consumed oil that has adsorbed into the NOx trapping catalytic converter 12 and is called the "estimated amount of sulfur from oil." Thus, the estimated amount of sulfur from oil is calculated based on the adsorption rate Ko of sulfur from oil, the oil consumption amount OC, and the sulfur concentration Sconc.o of the oil.

In short, the sulfur poisoning amount estimating section of the ECU 14 executes the steps S1 to S3 and thereby estimates the total estimated sulfur poisoning amount Ssum based on the estimated amount of sulfur from fuel and the estimated amount of sulfur from oil. After calculating the total estimated sulfur poisoning amount Ssum in step S3, the ECU 14 proceeds to step S4 and calculates a ratio of the total estimated sulfur poisoning amount Ssum that comes from oil (a ratio Ro of sulfur from oil) using the equation shown below.

$$Ro = (Ko \times OC \times Sconc.o) / Ssum \quad (2)$$

After calculating the ratio Ro of sulfur from oil in step S4, the ECU 14 proceeds to step S5 and sets a determination threshold value (prescribed threshold value) SL to be used in a determination executed in step S6. The determination threshold value SL is a prescribed threshold value for determining if a sulfur poisoning removal should be executed or not. More specifically, if the sulfur poisoning amount Ssum is larger than the determination threshold value SL, then the ECU 14 executes a sulfur poisoning removal.

Figure 6:
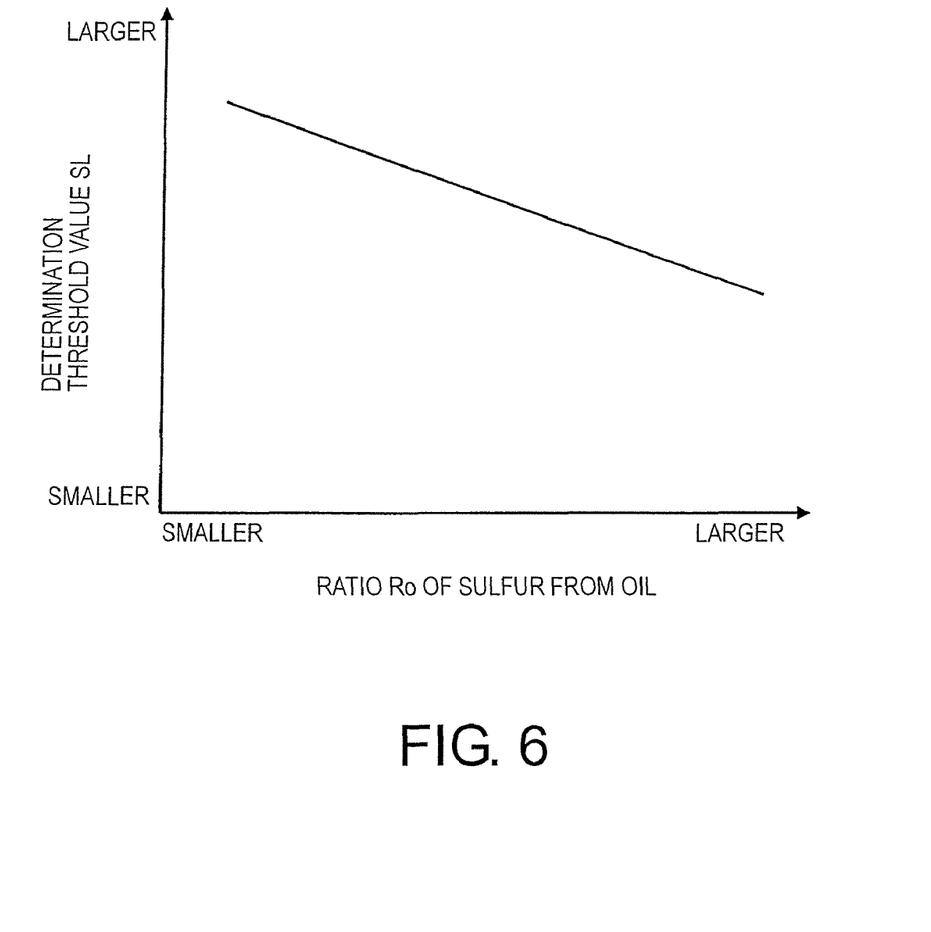
FIG. 6 is a graph illustrating a relationship of a determination threshold value SL with respect to a ratio of estimated amount of sulfur coming from oil to a total estimated sulfur poisoning amount in the NOx trapping catalytic converter.

In step S5, the ECU 14 finds the determination threshold value SL based on the ratio Ro of sulfur from oil using the map shown in FIG. 6. As shown in FIG. 6, the map indicates a relationship of the determination threshold value SL with respect to the ratio Ro of sulfur from oil and the relationship is established such that as the ratio Ro of sulfur from oil becomes larger, the determination threshold value SL becomes smaller. The relationship is established in this manner so that as the ratio Ro of sulfur from oil becomes larger (i.e., as the oil consumption amount becomes larger), the sooner a sulfur poisoning removal operation will be executed and the sooner calcium adsorbed onto the catalytic converter 12 will be removed. In this way, the decline of the catalytic activity of the catalytic converter 12 is suppressed and the decline of the poisoning removal rate achieved during a sulfur poisoning removal is suppressed. The determination threshold value SL becomes smaller, the more frequently sulfur poisoning removals will be executed. In other words, as the determination threshold value SL is set to a smaller value, the interval between sulfur poisoning removals becomes the shorter.

After setting the determination threshold value SL in step S5, the ECU 14 proceeds to step S6 and determines if the total estimated sulfur poisoning amount Ssum is larger than the determination threshold value SL.

If the ECU 14 determines in step S6 that the sulfur poisoning amount Ssum is not larger than the determination threshold value SL, then the ECU 14 ends the control loop because it will not execute a sulfur poisoning removal.

If the ECU 14 determines in step S6 that the sulfur poisoning amount Ssum is larger than the determination threshold value SL, then the ECU 14 proceeds to step S7.

Figure 7:
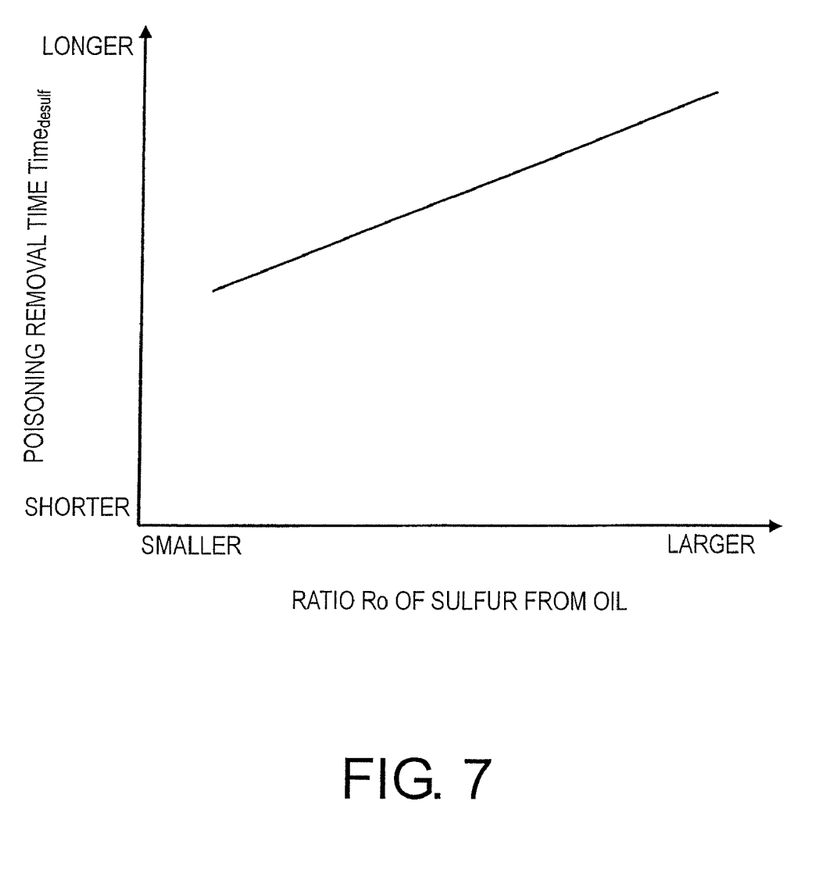
FIG. 7 is a plot illustrating a relationship of a poisoning removal time with respect to a ratio of estimated amount of sulfur coming from oil to a total estimated sulfur poisoning amount in the NOx trapping catalytic converter.

In step S7, the ECU 14 uses the map shown in FIG. 7 to find a poisoning removal time $Time_{desulf}$ based on the ratio Ro of sulfur from oil. As shown in FIG. 7, the map indicates a relationship of the poisoning removal time $Time_{desulf}$ with respect to the ratio Ro of sulfur from oil and the relationship is established such that as the ratio Ro of sulfur from oil becomes larger, the poisoning removal time $Time_{desulf}$ becomes longer. As described previously, as the ratio Ro of sulfur from oil becomes larger (i.e., as the oil consumption amount becomes larger), the more the catalytic activity declines and the more the poisoning removal rate obtained during sulfur poisoning removal declines. Therefore, as the ratio Ro of sulfur from oil becomes larger, the poisoning removal time $Time_{desulf}$ is set to be longer so that the sulfur poisoning can be removed reliably even if the catalytic activity and, thus, the poisoning removal rate attainable during sulfur poisoning removal have declined.

After setting the poisoning removal time $Time_{desulf}$ in step S7, the ECU 14 proceeds to step S8 and sets a poisoning removal temperature $Temp_{desulf}$.

Figure 8:
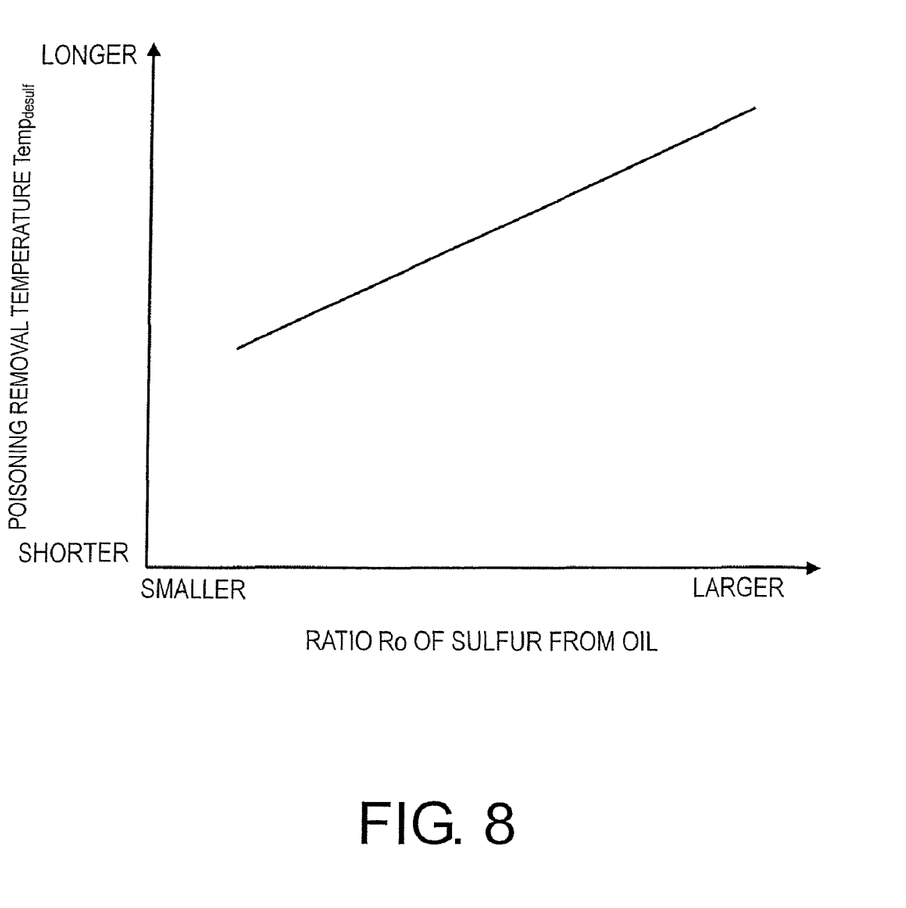
FIG. 8 is a plot illustrating a relationship of a poisoning removal temperature with respect to a ratio of estimated amount of sulfur from oil to a total estimated sulfur poisoning amount in the NOx trapping catalytic converter.

In step S8, the ECU 14 uses the map shown in FIG. 8 to find a poisoning removal temperature $Temp_{desulf}$ based on the ratio Ro of sulfur from oil. As shown in FIG. 8, the map indicates a relationship of the poisoning removal temperature $Temp_{desulf}$ with respect to the ratio Ro of sulfur from oil and the relationship is established such that as the ratio Ro of sulfur from oil becomes larger, the poisoning removal temperature $Temp_{desulf}$ becomes higher. As described previously, as the ratio Ro of sulfur from oil becomes larger (i.e., as the oil consumption amount becomes larger), the more the catalytic activity declines and the more the poisoning removal rate obtained during sulfur poisoning removal declines. Therefore, as the ratio Ro of sulfur from oil becomes larger, the poisoning removal temperature $Temp_{desulf}$ is set higher so that the sulfur poisoning can be removed reliably even if the catalytic activity and, thus, the poisoning removal rate attainable during sulfur poisoning removal have declined. A minimum value of the poisoning removal temperature $Temp_{desulf}$ is, for example, 750° C.

After setting the poisoning removal temperature $Temp_{desulf}$ in step S8, the ECU 14 proceeds to step S9 and executes a sulfur poisoning removal by raising a temperature of the NOx trapping catalytic converter 12 (catalyst temperature) to the poisoning removal temperature $Temp_{desulf}$. During the sulfur poisoning removal, the air-fuel ratio of the exhaust gas is adjusted to a stoichiometric or rich value.

Methods of raising the catalyst temperature to the poisoning removal temperature $Temp_{desulf}$ will now be explained. A first method involves raising the catalyst temperature to the poisoning removal temperature $Temp_{desulf}$ by retarding the fuel injection timing so as to increase the exhaust gas temperature. Since retarding the fuel injection timing causes the engine torque to decline, the fuel injection amount needs to be increased in order to compensate. The controls of the fuel injection timing and the fuel injection amount are continued for the duration of the poisoning removal time $Time_{desulf}$.

A second method involves executing an additional fuel injection (post injection) during the power stroke or the exhaust stroke after the normal fuel injection executed during the compression stroke so as to increase the exhaust gas temperature and raise the catalyst temperature to poison removal temperature $Temp_{desulf}$. The injection amount of the post injection is set in accordance with the poison removal temperature $Temp_{desulf}$. This post injection is continued for the duration of the poisoning removal time $Time_{desulf}$.

A third method is to control the opening degrees of the intake throttle valve 5 and the EGR valve 11 and thereby control an exhaust gas recirculation amount such that the exhaust gas temperature rises and the catalyst temperature is raised to the poisoning removal temperature $Temp_{desulf}$. This EGR amount control is continued for the duration of the poisoning removal time $Time_{desulf}$. It is also possible to combine this third method with the first method (retardation of the fuel injection timing) or the second method (execution of a post injection). The methods of raising the catalyst temperature to the poisoning removal temperature $Temp_{desulf}$ is not limited to these methods.

After the sulfur poisoning removal is executed in step S9, the ECU 14 proceeds to step S10 and resets the summation values (i.e., the fuel consumption amount Qfin and the traveled distance L) and ends the control loop.

In this embodiment, the apparatus is provided with a sulfur poisoning amount estimating section (ECU 14) and a sulfur poisoning removal section (ECU 14). The sulfur poisoning amount estimating section (ECU 14) estimates the total estimated sulfur poisoning amount Ssum of the NOx trapping catalytic converter 12 based on a fuel consumption amount Qfin and an oil consumption amount OC. The sulfur poisoning removal section (ECU 14) performs a sulfur poisoning removal operation that removes sulfur poisoning by raising a temperature of the NOx trapping catalytic converter 12 to a temperature $Temp_{desulf}$ at which sulfur poisoning can be removed when the estimated sulfur poisoning amount indicates that the sulfur poisoning should be removed. As a result, the total estimated sulfur poisoning amount Ssum can be estimated accurately and poisoning removal can be executed in an optimal fashion so as to maintain a high NOx cleaning rate.

Also, this embodiment can estimate the total estimated sulfur poisoning amount Ssum of the NOx trapping catalytic converter 12 with a higher degree of accuracy because the sulfur poisoning amount estimating section (ECU 14) estimates the total estimated sulfur poisoning amount Ssum based on an amount of sulfur from fuel calculated based on the fuel consumption amount Qfin and the sulfur concentration Sconc.q of the fuel and an amount of sulfur from oil calculated based on the oil consumption amount OC and the sulfur concentration Sconc.o of the oil.

In this embodiment, the sulfur poisoning removal is executed each time the total estimated sulfur poisoning amount Ssum of the NOx trapping catalytic converter 12 reaches a prescribed threshold value (determination threshold value SL), and the prescribed threshold value (determination threshold value SL) is changed depending on the ratio of the estimated sulfur amount coming from oil to the total estimated sulfur poisoning amount Ssum of the NOx trapping catalytic converter (i.e., the ratio Ro of sulfur from oil). As a result, the sulfur poisoning removal can be accomplished in an efficient manner that takes into account changes in the poisoning removal rate resulting from changes in the ratio Ro of sulfur from oil. Also, by executing the sulfur poisoning removal in accordance with changes in the variable poisoning removal rate, excessive removal can be prevented, and thus, thermal degradation of the catalytic converter 12 and degradation of the exhaust gas can be suppressed.

In this embodiment, as the ratio of the estimated sulfur amount coming from oil to the total estimated sulfur poisoning amount Ssum of the NOx trapping catalytic converter becomes larger (i.e., the ratio Ro of sulfur from oil becomes larger), the prescribed threshold value (determination threshold value SL) is set smaller. As a result, the interval between sulfur poisoning removals can be shortened when the ratio Ro of sulfur from oil increases and declination of the poisoning removal rate resulting from the increase in the ratio Ro of sulfur from oil can be suppressed.

In this embodiment, the poisoning removal time $Time_{desulf}$ over which the sulfur poisoning removal is executed is changed depending on the ratio of the estimated sulfur amount coming from oil to the total estimated sulfur poisoning amount Ssum of the NOx trapping catalytic converter (i.e., the ratio Ro of sulfur from oil). As a result, the sulfur poisoning removal can be accomplished in an efficient manner that takes into account changes in the poisoning removal rate resulting from changes in the ratio Ro of sulfur from oil.

In this embodiment, as the ratio of the estimated sulfur amount coming from oil to the total estimated sulfur poisoning amount Ssum of the NOx trapping catalytic converter becomes larger (i.e., the ratio Ro of sulfur from oil becomes larger), the poisoning removal time $Time_{desulf}$ is set longer. As a result, the even if the poison removal rate declines due to an increase in the ratio Ro of sulfur from oil, the sulfur poisoning can be removed reliably because the lower removal rate can be compensated for by lengthening the poisoning removal time.

In this embodiment, the poisoning removal temperature $Temp_{desulf}$ at which the sulfur poisoning removal is executed is changed depending on the amount of sulfur of the total estimated sulfur poisoning amount Ssum of the NOx trapping catalytic converter 12 that is made up of sulfur from oil (ratio Ro of sulfur from oil). As a result, the sulfur poisoning removal can be accomplished in an efficient manner that takes into account changes in the poisoning removal rate resulting from changes in the ratio Ro of sulfur from oil, and excessive removal can be prevented so as to suppress thermal degradation of the catalytic converter 12.

In this embodiment, as the ratio of the estimated sulfur amount coming from oil to the total estimated sulfur poisoning amount Ssum of the NOx trapping catalytic converter becomes larger (i.e., the ratio Ro of sulfur from oil becomes larger), the poisoning removal temperature $Temp_{desulf}$ is set higher. As a result, the even if the poison removal rate declines due to an increase in the ratio Ro of sulfur from oil, the sulfur poisoning can be removed reliably because the lower removal rate can be compensated for by raising the poisoning removal temperature.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like that includes a component, a section, a device or the like that does not require physical detection, but rather includes determining, measuring, modeling, predicting or computing or the like to carry out the operation or function. The term "configured" as used herein to describe a component, section or part of a device that includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, although in this embodiment the internal combustion engine is a compression ignition diesel engine, the present invention is not limited to such an engine and it is also acceptable to use a spark ignition gasoline engine. In such a case, spark plugs are arranged facing into the combustion chambers and, during sulfur poison removal, the catalyst temperature can be raised to a temperature at which the sulfur poisoning can be removed by retarding the ignition timing and raising the exhaust gas temperature. In addition, the size, functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An internal combustion engine exhaust gas cleaning apparatus comprising:
a NOx trapping catalytic converter arranged in an exhaust passage to trap NOx contained in an exhaust gas flowing through the exhaust passage when an air-fuel ratio of the exhaust gas is lean and to release trapped NOx when the air-fuel ratio of the exhaust gas is rich; and
an engine control unit in combination with a control program which when executed:
estimates an estimated sulfur poisoning amount of sulfur poisoning of the NOx trapping catalytic converter based on a fuel consumption amount, an oil consumption amount, a concentration of sulfur in the fuel, and a concentration of sulfur in the oil,
raises a temperature of the NOx trapping catalytic converter to a sulfur poisoning removal temperature based on the estimated sulfur poisoning amount to remove sulfur poisoning from the NOx trapping catalytic converter,
executes a sulfur poisoning removal operation each time the estimated sulfur poisoning amount reaches a prescribed threshold value, with the prescribed threshold value being changed depending on a sulfur ratio of an estimated amount of sulfur coming from oil to the estimated sulfur poisoning amount in the NOx trapping catalytic converter.

2. The internal combustion engine exhaust gas cleaning apparatus as recited in claim 1, wherein
the prescribed threshold value is set such that as the estimated amount of sulfur coming from the oil becomes larger, the prescribed threshold value becomes smaller.

3. An internal combustion engine exhaust gas cleaning apparatus comprising:
a NOx trapping catalytic converter arranged in an exhaust passage to trap NOx contained in an exhaust gas flowing through the exhaust passage when an air-fuel ratio of the exhaust gas is lean and to release trapped NOx when the air-fuel ratio of the exhaust gas is rich; and
an engine control unit in combination with a control program which when executed:
estimates an estimated sulfur poisoning amount of sulfur poisoning of the NOx trapping catalytic converter based on a fuel consumption amount, an oil consumption amount, a concentration of sulfur in the fuel, and a concentration of sulfur in the oil,
raises a temperature of the NOx trapping catalytic converter to a sulfur poisoning removal temperature based on the estimated sulfur poisoning amount to remove sulfur poisoning the NOx trapping catalytic converter, and
changes a sulfur poisoning removal time over which a sulfur poisoning removal operation is executed depending on a sulfur ratio of an estimated amount of sulfur coming from oil to the estimated sulfur poisoning amount in the NOx trapping catalytic converter.

4. The internal combustion engine exhaust gas cleaning apparatus as recited in claim 3, wherein
the engine control unit further executes the control program to set the sulfur poisoning removal time such that as the sulfur ratio of the sulfur poisoning amount of the NOx trapping catalytic converter that comes from oil becomes larger, the sulfur poisoning removal time becomes longer.

5. An internal combustion engine exhaust gas cleaning apparatus comprising:
a NOx trapping catalytic converter arranged in an exhaust passage to trap NOx contained in an exhaust gas flowing through the exhaust passage when an air-fuel ratio of the exhaust gas is lean and to release trapped NOx when the air-fuel ratio of the exhaust gas is rich; and an engine control unit in combination with a control program which when executed:

estimates an estimated sulfur poisoning amount of sulfur poisoning of the NOx trapping catalytic converter based on a fuel consumption amount, an oil consumption amount, a concentration of sulfur in the fuel, and a concentration of sulfur in the oil, raises a temperature of the NOx trapping catalytic converter to a sulfur poisoning removal temperature based on the estimated sulfur poisoning amount to remove sulfur poisoning from the NOx trapping catalytic converter, and changes the sulfur poisoning removal temperature for a sulfur poisoning removal operation depending on a sulfur ratio of an estimated amount of sulfur coming from oil to the estimated sulfur poisoning amount in the NOx trapping catalytic converter.

6. The internal combustion engine exhaust gas cleaning apparatus as recited in claim 5, wherein the engine control unit further executes the control program to set the sulfur poisoning removal temperature such that as the sulfur ratio of the sulfur poisoning amount of the NOx trapping catalytic converter that comes from oil becomes larger, the sulfur poisoning removal temperature becomes higher.

7. An exhaust gas cleaning method comprising:

estimating an estimated sulfur poisoning amount of sulfur poisoning of a NOx trapping catalytic converter arranged in an exhaust passage based on a fuel consumption amount, an oil consumption amount, a concentration of sulfur in the fuel, and a concentration of sulfur in the oil, removing sulfur poisoning from the NOx trapping catalytic converter by raising a temperature of the NOx trapping catalytic converter to a sulfur poisoning removal temperature based on the estimated sulfur poisoning amount; and the removing of the sulfur poisoning from the NOx trapping catalytic converter further including executing a sulfur poisoning removal operation each time the estimated sulfur poisoning amount reaches a prescribed threshold value, with the prescribed threshold value being changed depending on a sulfur ratio of an estimated amount of sulfur coming from oil to the estimated sulfur poisoning amount in the NOx trapping catalytic converter.

8. The exhaust gas cleaning method as recited in claim 7, wherein the prescribed threshold value is set such that as the estimated amount of sulfur coming from the oil becomes larger, the prescribed threshold value becomes smaller.

9. An exhaust gas cleaning method comprising:

estimating an estimated sulfur poisoning amount of sulfur poisoning of a NOx trapping catalytic converter arranged in an exhaust passage based on a fuel consumption amount, an oil consumption amount, a concentration of sulfur in the fuel, and a concentration of sulfur in the oil; and removing sulfur poisoning from the NOx trapping catalytic converter by raising a temperature of the NOx trapping catalytic converter to a sulfur poisoning removal temperature based on the estimated sulfur poisoning amount, the removing of the sulfur poisoning from the NOx trapping catalytic converter further including changing a sulfur poisoning removal time over which a sulfur poisoning removal operation is executed depending on a sulfur ratio of an estimated amount of sulfur coming from oil to the estimated sulfur poisoning amount in the NOx trapping catalytic converter.

10. The exhaust gas cleaning method as recited in claim 9, wherein the removing of the sulfur poisoning from the NOx trapping catalytic converter further includes setting the sulfur poisoning removal time such that as the sulfur ratio becomes larger, the sulfur poisoning removal time becomes longer.

11. An exhaust gas cleaning method comprising:

estimating an estimated sulfur poisoning amount of sulfur poisoning of a NOx trapping catalytic converter arranged in an exhaust passage based on a fuel consumption amount, an oil consumption amount, a concentration of sulfur in the fuel, and a concentration of sulfur in the oil; and removing sulfur poisoning from the NOx trapping catalytic converter by raising a temperature of the NOx trapping catalytic converter to a sulfur poisoning removal temperature based on the estimated sulfur poisoning amount, the removing of the sulfur poisoning from the NOx trapping catalytic converter further including changing the sulfur poisoning removal temperature for a sulfur poisoning removal operation depending on a sulfur ratio of an estimated amount of sulfur coming from oil to the estimated sulfur poisoning amount in the NOx trapping catalytic converter.

12. The exhaust gas cleaning method as recited in claim 11, wherein the removing of the sulfur poisoning from the NOx trapping catalytic converter further includes setting the sulfur poisoning removal temperature such that as the sulfur ratio becomes larger, the sulfur poisoning removal temperature becomes higher.

* * * * *